T 864014

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1405

781,712

POLYMERIC TOBACCO SMOKE FILTER MATERIAL FOR THE SELECTIVE REMOVAL OF ACROLEIN

Ray E. Leonard, P.O. Box 511, Kingsport, Tenn. 37662

Continuation of application Ser. No. 648,972, June 26, 1967. This application Dec. 4, 1968. Published July 29, 1969

Int. Cl. A24f *7/04, 13/04;* A24b *15/00*

U.S. Cl. 131—266

No Drawing. 12 Pages Specification

Certain porous and permeable polymers such as cross-linked polystyrenes, ethyl vinyl-benzene-divinyl benzene, ethyl vinyl-styrene-divinyl benzene or any similar polymeric material can be added to or used as tobacco smoke filter elements for selectively removing acrolein from tobacco smoke. This polymeric material is preferably employed in particulate form and associated with a carrier material, such as filamentary cellulose acetate. The polymeric particles have a bulk density between 11.5 and 80 g./cc. and a surface area between about 100 and 660 $m.^2/g.$